United States Patent
Seo et al.

(10) Patent No.: US 9,985,761 B2
(45) Date of Patent: May 29, 2018

(54) METHOD AND DEVICE FOR TRANSCEIVING DEVICE-TO-DEVICE TERMINAL SIGNAL IN WIRELESS COMMUNICATION SYSTEM

(71) Applicant: LG ELECTRONICS INC., Seoul (KR)

(72) Inventors: Inkwon Seo, Seoul (KR); Hanbyul Seo, Seoul (KR); Kijun Kim, Seoul (KR); Hyukjin Chae, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 122 days.

(21) Appl. No.: 15/116,142

(22) PCT Filed: Feb. 26, 2015

(86) PCT No.: PCT/KR2015/001884
§ 371 (c)(1),
(2) Date: Aug. 2, 2016

(87) PCT Pub. No.: WO2015/130107
PCT Pub. Date: Sep. 3, 2015

(65) Prior Publication Data
US 2017/0187503 A1 Jun. 29, 2017

Related U.S. Application Data

(60) Provisional application No. 61/945,121, filed on Feb. 26, 2014.

(51) Int. Cl.
*H04W 4/00* (2018.01)
*H04L 5/00* (2006.01)
(Continued)

(52) U.S. Cl.
CPC ........ *H04L 5/0048* (2013.01); *H04L 25/0202* (2013.01); *H04W 72/0446* (2013.01); *H04W 72/085* (2013.01); *H04W 88/02* (2013.01)

(58) Field of Classification Search
CPC ............ H04L 5/0048; H04L 25/0202; H04W 72/0446; H04W 72/085; H04W 88/02
See application file for complete search history.

(56) References Cited

U.S. PATENT DOCUMENTS

| | | | |
|---|---|---|---|
| 8,493,887 B2 * | 7/2013 | Palanki | H04W 8/005 370/254 |
| 2014/0092761 A1 * | 4/2014 | Behravan | H04W 24/02 370/252 |

(Continued)

FOREIGN PATENT DOCUMENTS

WO   WO 2013/066128 A1   5/2013
WO   WO 2013/077684 A1   5/2013

OTHER PUBLICATIONS

Intel Corporation, "On message-based D2D discovery signal design," 3GPP TSG RAN WG1 Meeting #75, R1-135117, San Francisco, USA, Nov. 11-15, 2013, pp. 1/9-9/9.

(Continued)

*Primary Examiner* — Phuc H Tran
(74) *Attorney, Agent, or Firm* — Birch, Stewart, Kolasch & Birch, LLP (57) ABSTRACT

One embodiment of the present invention discloses a method by which a terminal receives a device-to-device (D2D) signal in a wireless communication system, the D2D signal receiving method comprising the steps of: receiving a subframe; receiving a first reference signal in a preset symbol of the subframe; and receiving reference signal pattern information in a symbol neighboring the preset symbol on the basis of the received reference signal, wherein if the reference signal pattern information indicates the (Continued)

transmission of a second reference signal, the terminal performs a linear interpolation during a channel estimation for a D2D signal demodulation in the subframe.

13 Claims, 9 Drawing Sheets

(51) Int. Cl.
*H04W 72/08* (2009.01)
*H04L 25/02* (2006.01)
*H04W 72/04* (2009.01)
*H04W 88/02* (2009.01)

(56) References Cited

U.S. PATENT DOCUMENTS

| | | |
|---|---|---|
| 2014/0269641 A1 | 9/2014 | Jang et al. |
| 2014/0286293 A1 | 9/2014 | Jang et al. |
| 2015/0029874 A1* | 1/2015 | Davydov ............. H04W 28/24 370/252 |
| 2016/0198414 A1* | 7/2016 | Yano .................. H04W 52/242 455/522 |

OTHER PUBLICATIONS

LG Electronics, "D2D Communication Physical Channel Design," 3GPP TSG RAN WG1 Meeting #75, R1-135480, San Francisco, USA, Nov. 11-15, 2013, 8 pages.

LG Electronics, "D2D Discovery Signal Format," 3GPP TSG RAN WG1 Meeting #76, R1-140336, Prague, Czech Republic, Feb. 10-14, 2014, pp. 1-7.

* cited by examiner

METHOD AND DEVICE FOR TRANSCEIVING DEVICE-TO-DEVICE TERMINAL SIGNAL IN WIRELESS COMMUNICATION SYSTEM

CROSS REFERENCE TO RELATED APPLICATIONS

This application is the National Phase of PCT International Application No. PCT/KR2015/001884, filed on Feb. 26, 2015, which claims priority under 35 U.S.C. 119(e) to U.S. Provisional Application No. 61/945,121, filed on Feb. 26, 2014, all of which are hereby expressly incorporated by reference into the present application.

TECHNICAL FIELD

Following description relates to a wireless communication, and more particularly, to a method of transmitting and receiving signals in device-to-device communication and an apparatus therefor.

BACKGROUND ART

Wireless communication systems are widely deployed to provide various kinds of communication content such as voice and data. Generally, these communication systems are multiple access systems capable of supporting communication with multiple users by sharing available system resources (e.g., bandwidth and transmit power). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency-division multiple access (SC-FDMA) system, and a multi-carrier frequency division multiple access (MC-FDMA) system.

A device-to-device (hereinafter abbreviated D2D) communication corresponds to a communication scheme transmitting and receiving audio, data and the like between UEs without passing through an evolved Node B (hereinafter abbreviated eNB) by configuring a direct link between the UEs. The D2D communication can include such a communication scheme as a UE-to-UE communication scheme, a peer-to-peer communication scheme and the like. The D2D communication scheme can be applied to a M2M (machine-to-machine) communication, MTC (machine type communication) and the like.

The D2D communication is considered as a method of solving a burden of an eNB resulted from increasing data traffic. For instance, unlike a legacy wireless communication system, the D2D communication transmits and receives data between devices without passing through an eNB. Hence, the D2D communication can reduce network overload. Moreover, if the D2D communication is introduced, it may be able to expect reduced procedures of an eNB, reduced power consumption of devices participating in the D2D, increased data transmission speed, increased network capacity, load distribution, and enlarged a cell coverage and the like.

DISCLOSURE

Technical Problem

An object of the present invention is to provide a method for transceiving a reference signal based on frequency offset.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

According to one embodiment of the present invention, a method by which a user equipment (UE) receives a device-to-device (D2D) signal in a wireless communication system comprises the steps of receiving a subframe; receiving a first reference signal in a predetermined symbol of the subframe; and receiving reference signal pattern information in a symbol neighboring the predetermined symbol on the basis of the received reference signal, wherein if the reference signal pattern information indicates transmission of a second reference signal, the UE performs linear interpolation during channel estimation for D2D signal demodulation at the subframe.

According to one embodiment of the present invention, a D2D UE for receiving a D2D signal in a wireless communication system comprises a receive module; and a processor, wherein the processor receives a first reference signal in a predetermined symbol of a received subframe and receives reference signal pattern information in a symbol neighboring the predetermined symbol on the basis of the received reference signal, and if the reference signal pattern information indicates transmission of a second reference signal, the UE performs linear interpolation during channel estimation for D2D signal demodulation at the subframe.

The reference signal pattern information may be a predetermined sequence mapped into resource elements on the neighboring symbol.

The reference signal pattern information may be determined in accordance with a size of frequency offset between UEs which transmit and receive the D2D signal.

If the size of frequency offset is a predetermined value or less, the reference signal pattern information may indicate that the second reference signal is not transmitted.

The first reference signal and the second reference signal may respectively be transmitted from a fourth symbol and a first symbol of each slot of the subframe.

Slot hopping may be applied to the first reference signal.

The reference signal pattern information may be transmitted from a first slot only of the subframe if slot hopping is applied to the second reference signal.

The UE may determine whether slot hopping has been applied to the second reference signal through a cyclic shift value of the first reference signal.

Slot hopping may depend on a predetermined pattern if the slot hopping is applied to the second reference signal.

The slot hopping may be common within a D2D cluster.

The UE may assume that data are not mapped into a symbol, to which the second reference signal is transmitted, during D2D signal demodulation at the subframe if the reference signal pattern information indicates transmission of the second reference signal.

The reference signal pattern information may be shifted on a frequency axis in accordance with a cyclic shift value of the first reference signal.

Advantageous Effects

According to the present invention, a reference signal may be used adaptively in accordance with frequency offset, whereby demodulation performance may be maximized.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc. Also, in the following description, the base station may be used to refer to a scheduling node, a cluster header, or the like. If the base station or the relay also transmits a signal which is transmitted from the UE, the base station or the relay may be regarded as a kind of UE.

A cell described hereinafter is applied to a transceiving point such as a base station (eNB), a sector, a remote radio head (RRH), and a relay, and may be used as a comprehensive term for identifying a component carrier from a specific transceiving point.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

Figure 1:
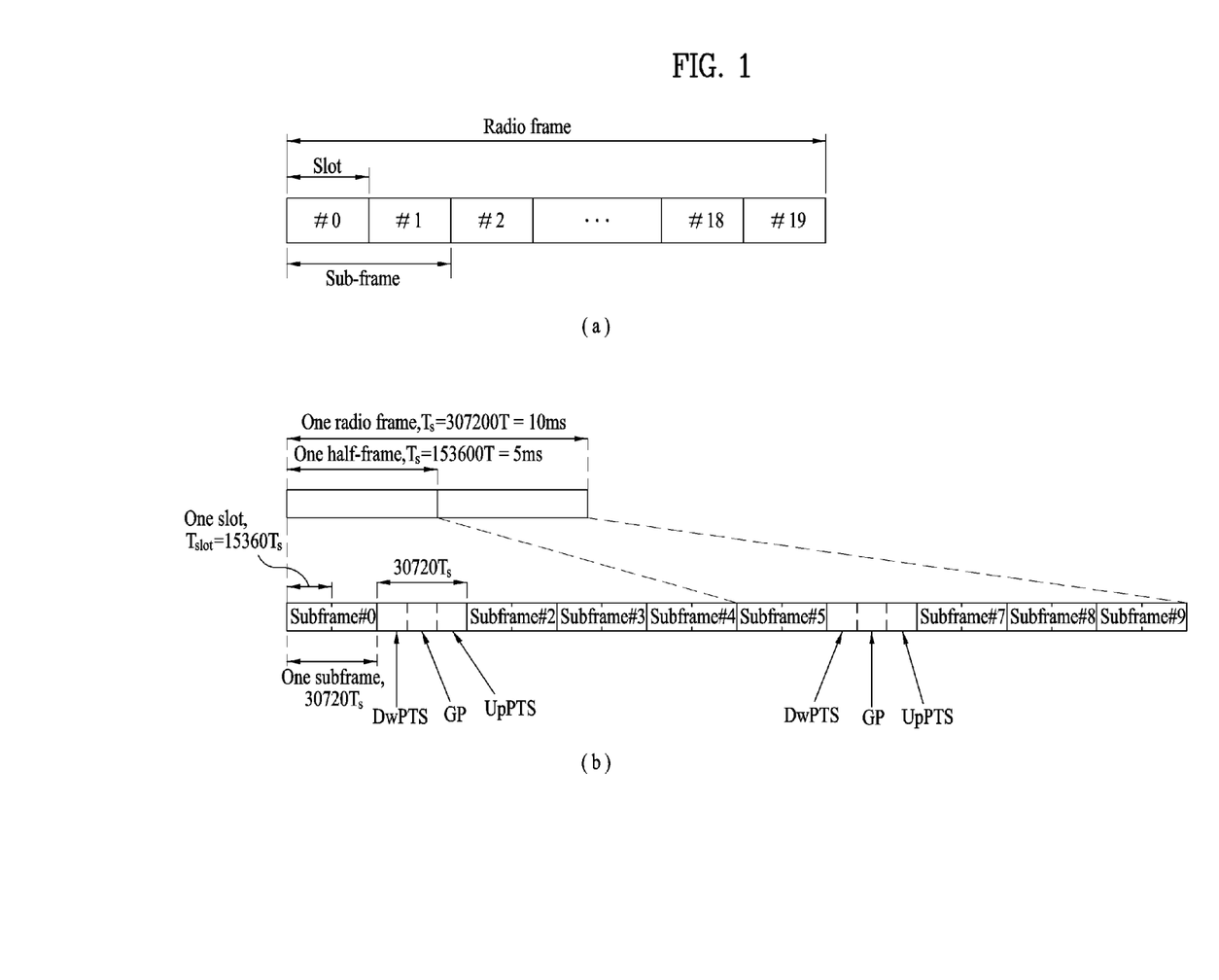
FIG. 1 is a diagram for a structure of a radio frame.

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
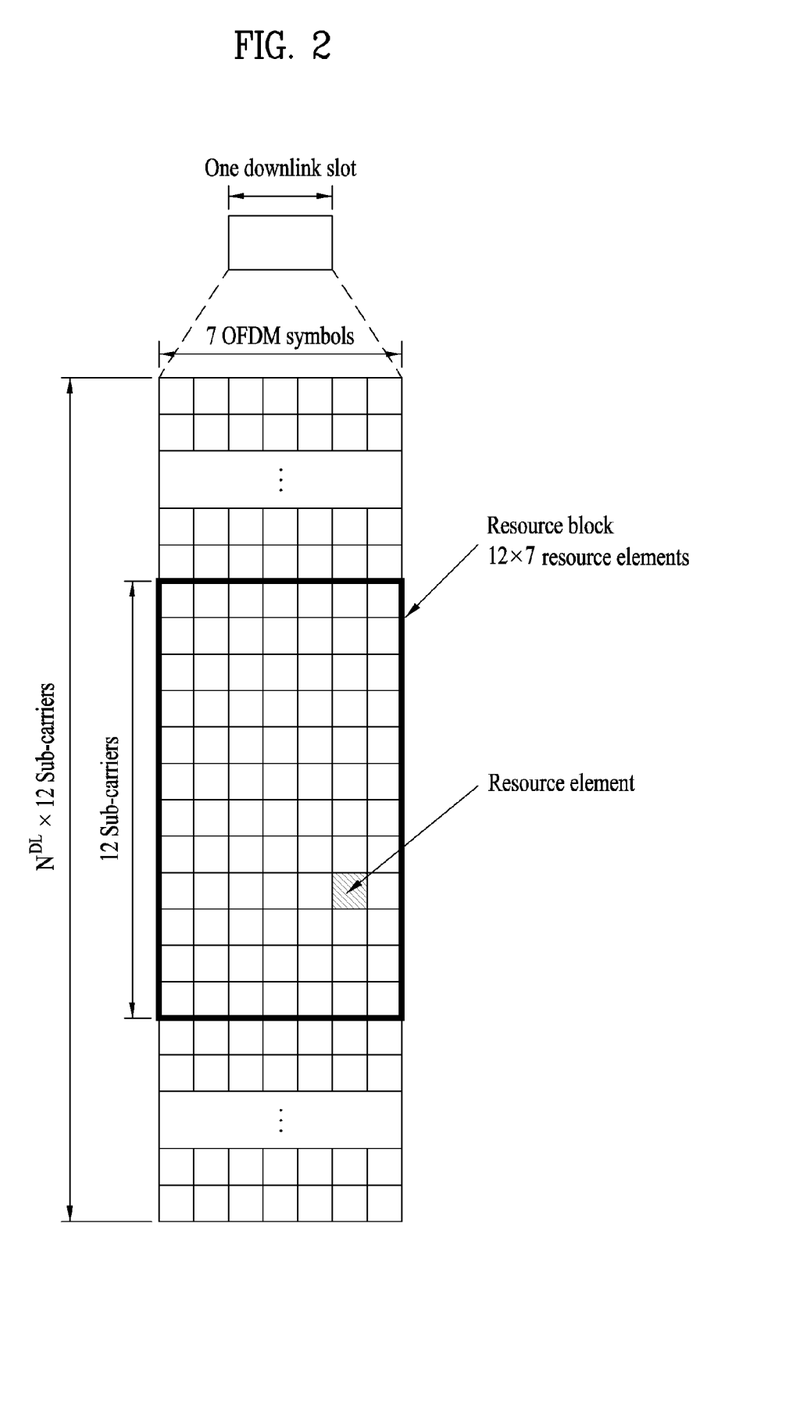
FIG. 2 is a diagram for a resource grid in downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
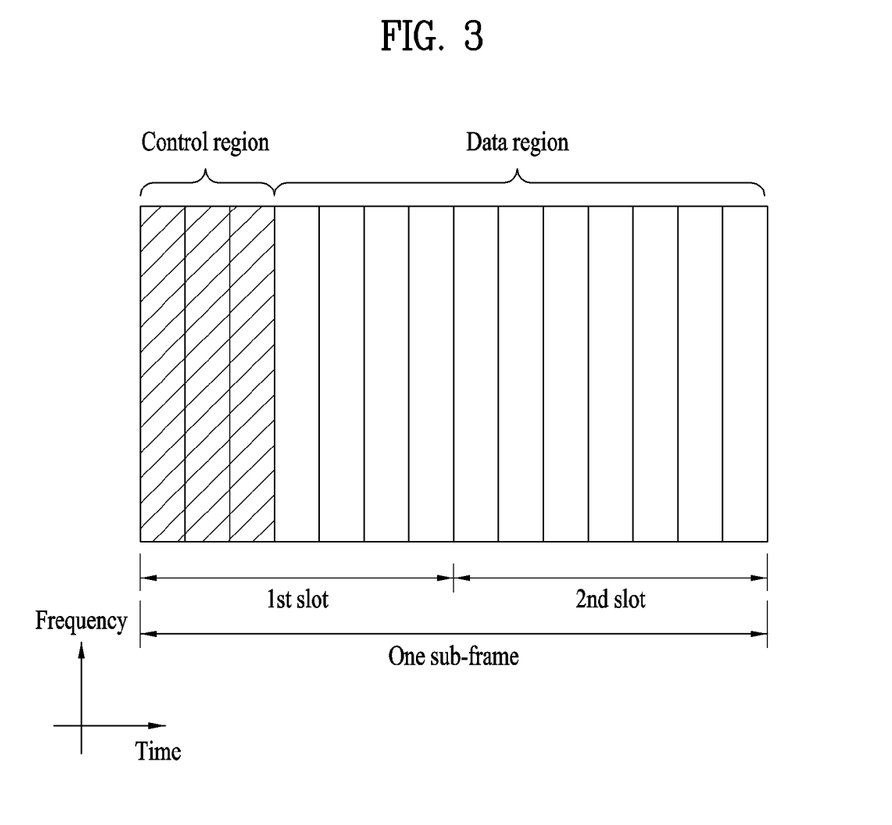
FIG. 3 is a diagram for a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The number of CCEs required for PDCCH may be varied depending on a coding rate and a size of DCI. For example, any one of the number 1, 2, 4, 8 (respectively corresponding to PDCCH formats 0, 1, 2, 3) of CCEs may be used for PDCCH transmission, and if the size of the DCI is great and/or a low coding rate is required due to a channel state which is not good, a relatively large number of CCEs may be used for one PDCCH transmission. The eNB determines a PDCCH format by considering a size of DCI, which is transmitted to the UE, a cell bandwidth, the number of downlink antenna ports, and the amount of PHICH resources, and adds cyclic redundancy check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
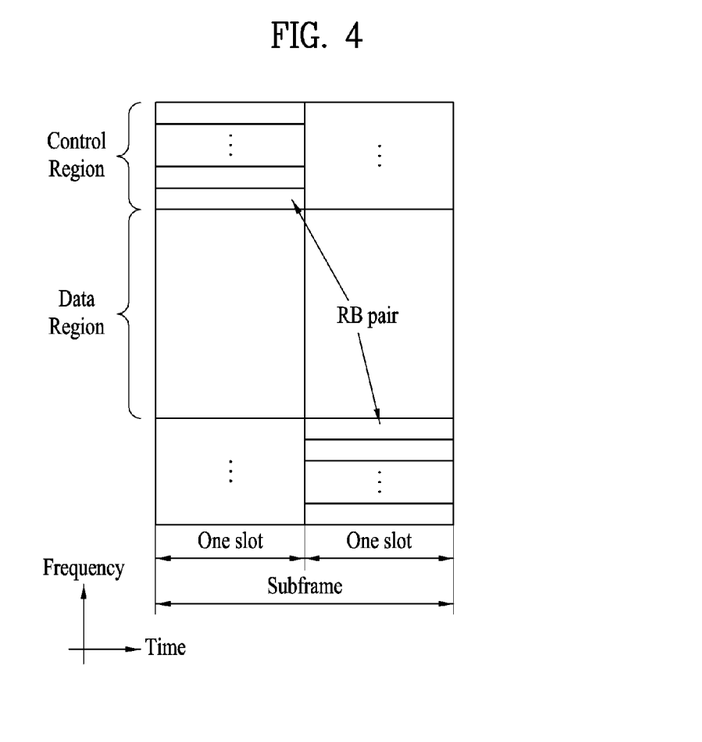
FIG. 4 is a diagram for a structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Synchronization Acquisition of D2D UE

Hereinafter, synchronization acquisition between UEs in D2D communication will be described based on the aforementioned description and a legacy LTE/LTE-A system. If time synchronization and frequency synchronization are not matched with each other in an OFDM system, it may be difficult to perform multiplexing between UEs different from each other in an OFDM signal due to inter-cell interference. If each of D2D UEs individually matches synchronization in a manner of directly transceiving a synchronization signal between D2D UEs, it is inefficient. Therefore, in a distributed node system such as D2D, a specific node transmits a representative synchronization signal and the other UEs may match synchronization in accordance with the representative synchronization signal. In other word, in order to transmit and receive a D2D signal, a scheme of transmitting and receiving a signal in a manner that a part of nodes (in this case, a node may correspond to an eNB, a UE, or an SRN (synchronization reference node or a synchronization source)) transmits a D2D synchronization signal (D2DSS) and the other UEs match synchronization with the D2DSS.

The D2D synchronization signal may include a primary D2DSS (PD2DSS) and a secondary D2DSS (SD2DSS). The PD2DSS may correspond to a Zadoff-chu sequence of a prescribed length or a structure similar/transformed/repeated to/from a PSS. The SD2DSS may correspond to an M-sequence or a structure similar/transformed/repeated to/from an SSS. If UEs match synchronization from an eNB, an SRN becomes the eNB and a D2DSS becomes a PSS/SSS. A PD2DSCH (Physical D2D synchronization channel) may correspond to a (broadcast) channel to which basic (system) information (e.g., information on a D2DSS, DM (duplex mode), TDD UL/DL configuration, information on a resource pool, a type of application related to a D2DSS, etc.), which should be known to a UE before a D2D signal is transmitted and received, is transmitted. The PD2DSCH may be transmitted on a subframe at which a D2DSS is transmitted or a following subframe of the subframe at which the D2DSS is transmitted.

The SRN may correspond to a node that transmits a D2DSS and a PD2DSCH (Physical D2D synchronization channel). The D2DSS may have a form of a specific sequence and the PD2DSCH may correspond to a sequence indicating specific information or may have a form of a codeword obtained by a predetermined channel coding. In this case, the SRN may become an eNB or a specific D2D UE. In case of partial network coverage or out of network coverage, a UE may become the SRN. Even in case of intercell discovery, in order that neighboring cell UEs know a timing, a UE may relay a D2DSS at the time when a certain offset is added to a timing of the D2DSS received by the UEs from the SRN. That is, the D2DSS may be relayed through a multi-hop. If a plurality of UEs relay the D2DSS or there are a plurality of clusters in the periphery, the UE which receives the D2DSS may observe several D2DSSs, and may receive the D2DSS having hops different from each other.

Transmission of Reference Signal in D2D Communication

Hereinafter, a method for transmitting a reference signal in D2D communication according to one embodiment of the present invention will be described.

Figure 5:
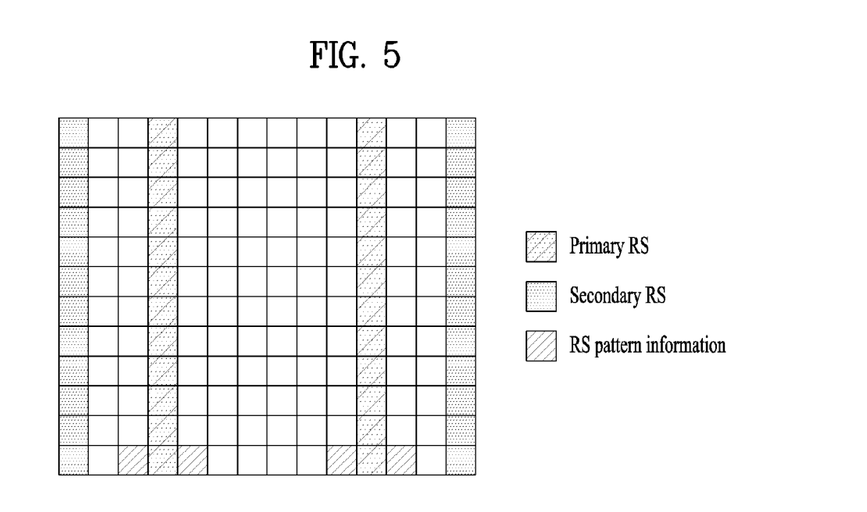
FIGS. 5 to 8 are diagrams illustrating transmission of a reference signal according to the embodiment of the present invention.

In view of a UE which receives a D2D signal, the UE may receive a subframe, and may receive a first reference signal (or primary RS) from a predetermined symbol of the received subframe. The UE may receive reference signal pattern information from a symbol (the predetermined symbol) to which the first reference signal is transmitted, on the basis of the first reference signal. The reference signal pattern information may be determined in accordance with a size of frequency offset between UEs which transmit and receive the D2D signal to and from each other. If the reference signal pattern information indicates transmission of a second reference signal (or secondary RS), the UE may perform channel estimation by transmitting the first reference signal and the second reference signal, and may demodulate the D2D signal on the basis of the result of channel estimation. In other words, if the reference signal pattern information indicates transmission of the second reference signal, the UE may perform linear interpolation during channel estimation for D2D signal demodulation at the subframe. That is, if the reference signal pattern information indicates transmission of the second reference signal, the UE may assume that data have not been mapped into the symbol to which the second reference signal is transmitted. The reference signal pattern information may be a predetermined sequence mapped into resource elements on the neighboring symbol. For example, the reference signal pattern information may be transmitted from a resource element RE on a symbol (third and fifth OFDM symbols of each slot) neighboring the symbol to which the first reference signal is transmitted from each slot, as illustrated in FIG. 5. That is, information as to a reference signal pattern used for the symbol neighboring the first reference signal at the current subframe may be notified to other party UE. Also, the reference signal pattern information may be transmitted every subframe or in accordance with a certain period.

Figure 6:
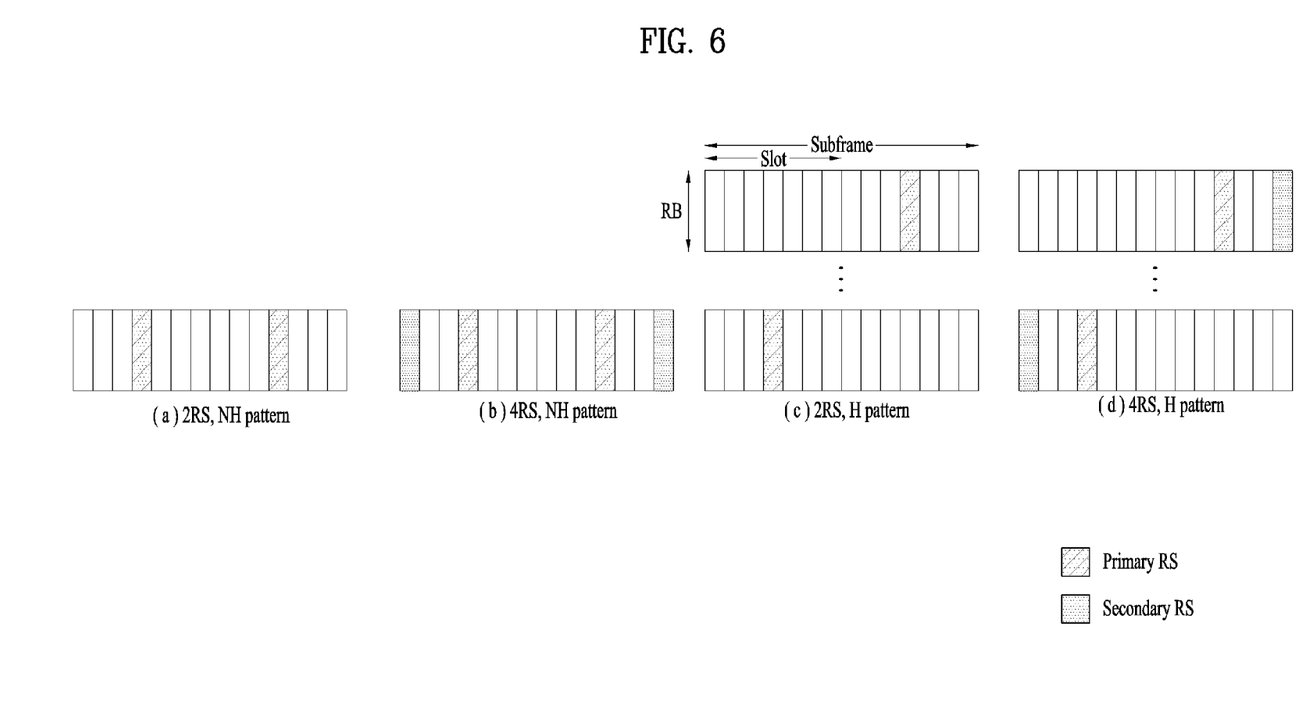

Slot hopping may be applied to the first reference signal. Also, slot hopping may also be applied to the second reference signal (in case of normal CP, that is, a case where one subframe is comprised of 14 OFDM symbols). The first reference signal and the second reference signal may respectively be transmitted from a fourth symbol (location of a legacy PUSCH DMRS) and a first symbol of each slot of the subframe. Therefore, four types of patterns of the reference signal are available in the embodiment as shown in FIG. 6 (in FIG. 6, it is assumed that hopping of the first reference signal and hopping of the second reference signal are applied at the same time). In more detail, FIG. 6(*a*) may correspond to a case where the second reference signal is not transmitted and hopping is not applied to the first reference signal (marked with NH pattern in the drawing), FIG. 6(*b*) may correspond to a case where the second reference signal is transmitted and hopping is not applied to the first and second reference signals, FIG. 6(*c*) may correspond to a case where the second reference signal is not transmitted and hopping is applied to the first reference signal, and FIG. 6(*d*) may correspond to a case where the second reference signal is transmitted and hoppling is applied to the first and second reference signals (although the present invention is described based on a normal CP, an extended CP may be applied to the present invention equally to the normal CP at a given location of the reference signal).

Figure 7:
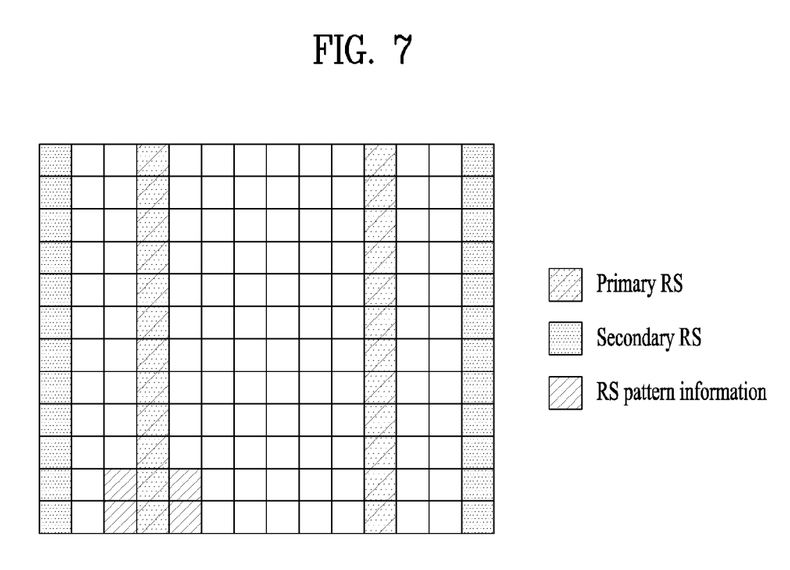

If slot hopping is applied to the first reference signal, the reference signal pattern information may be transmitted from the first slot only of the subframe as illustrated in FIG. 7. And, the UE may determine whether slot hopping has been applied to the second reference signal, through a cyclic shift value of the first reference signal. For example, if the cyclic shift value is an odd number, it may previously be scheduled that slot hopping is applied to the second reference signal (opposite case is available). If slot hopping is applied to the second reference signal, slot hopping may depend on a predetermined pattern, and may be common within a D2D cluster.

In order to assure reliability of the reference signal pattern information, v-shift may be applied to the reference signal pattern information. This is to prevent collision from being generated between the reference signal pattern information if a plurality of D2D UEs try D2D communication in the same area. The v-shift value of the reference signal pattern information may be determined based on information of the first reference signal. For example, the v-shift value may be determined in accordance with ID of a transmitting UE, a cyclic shift value of the first reference signal, etc.

In short, information on the reference signal pattern may be transmitted additionally when the D2D signal is transmitted. As described above, the reference signal pattern information may be determined in accordance with a size of frequency offset. For example, if the size of frequency offset is a predetermined value (e.g., 400 Hz) or less, the reference signal pattern information may indicate that the second reference signal is not transmitted, and if the size of frequency offset is greater than the predetermined value, the reference signal pattern information may indicate that the second reference signal is transmitted. As described above, four types of reference signal patterns as shown in FIG. 6 may be used selectively in accordance with the size of frequency offset in D2D signal transmission and reception according to the embodiment of the present invention. As a result, optimized performance may be obtained in accordance with the size of frequency offset. In more detail, the UE may have frequency offset as illustrated in Table 1 below as the case may be.

TABLE 1

| | Maximum frequency error | Maximum frequency offset at 700 MHz | Maximum frequency offset at 2 GHz |
| --- | --- | --- | --- |
| Two UEs have the same frequency reference cell | 0.2 PPM | 140 Hz | 400 Hz |
| Two UEs have different frequency reference cell (wide area eNB) | 0.3 PPM | 210 Hz | 600 Hz |
| Two UEs have different frequency reference cell (medium range/local area eNB) | 0.4 PPM | 280 Hz | 800 Hz |

Figure 8:
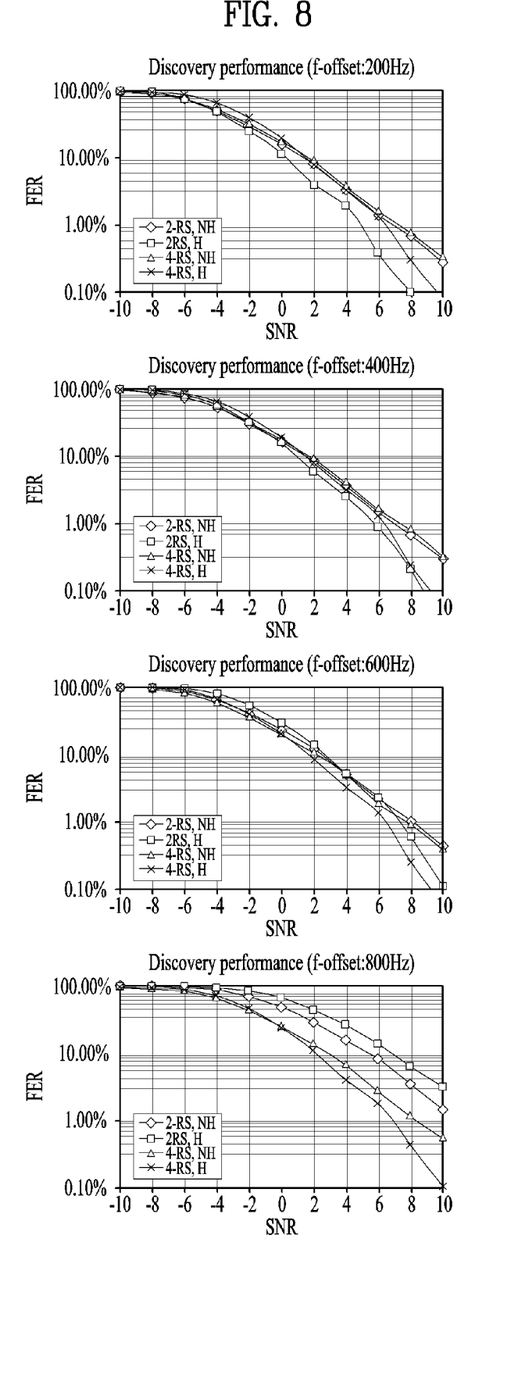

Frequency offset may be more increased in case of out of coverage UEs in D2D communication. Simulation results of demodulation performance when frequency offset is 200 Hz, 400 Hz, 600 Hz and 800 Hz are shown in FIG. 8. In FIG. 8, channel estimation based on linear interpolation has been performed in case of 2RS NH, 4RS NH, and 4RS H, and channel estimation in the form of slot average has been performed in case of 2RS H because a reference signal existing within a slot corresponds to only one symbol. (That is, a channel component estimated at the OFDM symbol to which the reference signal is transmitted has been equally applied to all symbols of the corresponding slot.)

Referring to FIG. 8, if frequency offset is low, since performance degradation caused by frequency offset is reduced, it is noted that a 2RS pattern having a relatively low coding rate has performance better than that of a 4RS pattern. If frequency offset is 600 Hz or more, the 4RS pattern which may correct frequency offset more exactly has better performance. If frequency offset is 800 Hz or more, performance of 2RS H is more deteriorated than that of 2RS NH. This is because that frequency offset correction capability is more important than diversity gain based on hopping and coding rate in frequency offset of a certain level or more. As described above, the reference signal pattern having the best performance may be varied depending on the size of frequency offset. Therefore, transmission of the second reference signal, that is, pattern information of the reference signal may be determined depending on the size of frequency offset in the same manner as the aforementioned embodiment, whereby the reference signal pattern of optimized performance may be determined depending on the size of frequency offset, and the determined reference signal pattern may be notified to the other party UE.

The aforementioned description may be applied to either a case where a transmitting UE fails to perform a procedure of frequency offset estimation and reference signal pattern recommendation during D2D communication which will be described later or a case of broadcast.

Although the reference signal pattern has been notified through the reference signal pattern information in the aforementioned embodiment, as a method different from the reference signal pattern, interaction between the first reference signal and the reference signal pattern of the subframe may be defined. For example, if the first reference signal is defined in the same manner as the legacy PUSCH DMRS and cyclic shift is defined, the reference signal pattern of the corresponding subframe may interact with a cyclic shift value obtained through blind detection, etc. For example, if the cyclic shift value is determined as a value between 0 and 11, even values may mean 2 reference signal patterns and odd values may mean 4 reference signal patterns. Likewise, hopping or non-hopping may be defined. If hopping or non-hopping may be set differently per subframe, since it may not assure that the second slot is in the same frequency domain, the reference signal pattern information may be transmitted in the form of FIG. 7. In this case, a receiving UE may first obtain the reference signal pattern by trying decoding for the reference signal pattern information on the basis of the first reference signal transmitted to the first slot and then may perform demodulation of the corresponding subframe on the basis of the corresponding reference signal pattern. Alternatively, if hopping or non-hopping is considered, since interference coordination and cancellation between D2D pairs may be complicated, hopping or non-hopping may be determined using a method for equally applying hopping or non-hopping within one synchronization cluster (or D2D pair sets which share the same resource), and 2 reference signal patterns or 4 reference signal patterns may be determined in the reference signal pattern information. In this case, eNB or UE which serves as a header of a synchronization cluster may signal hopping or non-hopping within the synchronization cluster.

As another method, the receiving UE may obtain the reference signal pattern used for the D2D signal through blind detection (e.g., energy detection), etc. In this case, the first reference signal may mean the reference signal which is always transmitted, and the second reference signal may mean whether the reference signal may be transmitted. For flexibility, a plurality of patterns may be defined for the second reference signal. For example, a plurality of reference signal symbol combinations may be defined in advance, and the receiving UE may obtain a transmission pattern of the second reference signal and whether to transmit the second reference signal, through blind detection for corresponding candidates.

Determination of Frequency Offset and Transmission of Reference Signal in D2D Communication Hereinafter, a method for measuring (and/or exchanging) frequency offset between D2D UEs and using different reference signal patterns depending on frequency offset will be described. The following embodiment may be understood as a method for determining a reference signal pattern in the aforementioned embodiment (or determining reference signal pattern information). Alternatively, the following description may be used as an independent embodiment, UEs which constitute a D2D pair may transmit a signal (a reference signal structure of a corresponding signal may in advance be defined for frequency offset measurement. For example, D2D synchronization signal, reference signal for scheduling allocation, reference signal for discovery, reference signal for data, etc.) in the form of measuring frequency offset to the other party D2D UE, and the UE which has received the corresponding signal may feed frequency offset (or reference signal pattern suitable for corresponding frequency offset) back by measuring the corresponding frequency offset. For example, if frequency offset between UEs is 400 Hz or less, 2 reference signal hopping (FIG. 6(c)) patterns may be recommended, and if frequency offset between UEs is greater than 400 Hz, 4 reference signal hopping (FIG. 6(d)) patterns may be recommended. Since receiving frequency offsets of two UEs which belong to a D2D pair may be different from each other, it is preferable that the above procedure is performed bidirectionally.

Figure 9:
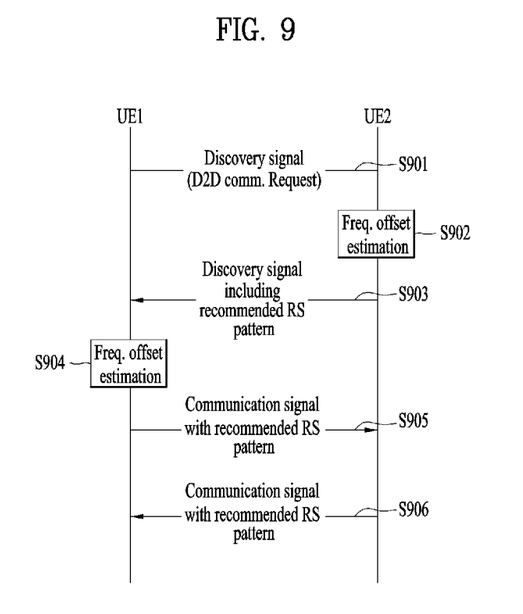
FIG. 9 is a diagram illustrating determination and transmission of a reference signal according to the embodiment of the present invention.

The example of the above embodiment is shown in FIG. 9. Referring to FIG. 9, at step S901, a first UE may transmit a discovery signal (or D2D communication request or another structural signal may be defined. For example, scheduling assignment for performing resource allocation and control signaling of communication, and D2D synchronization signal if one UE of a D2D pair transmits the D2D synchronization signal) to a second UE. At this time, a reference signal pattern through which the receiving UE may measure frequency offset may be used for the discovery signal. Frequency offset measurement may be performed per subcarrier (that is, unit resource in a frequency domain). Frequency offset may be measured by comparison of channel components of two REs existing in different time resources while the same frequency resource is being used. For example, for estimation of frequency offset, in the same manner as the cases of 2 RS NH, 4 RS NH and 4 RS H of FIG. 6, a reference signal pattern transmitted to different time symbols may be used while the same subcarrier is being used. In NH case, frequency offset between neighboring reference signals may be measured, whereby the measured frequency offset may be applied to the corresponding subframe. In case of 4 RS H, frequency offset at the corresponding slot may be measured through two reference signal symbols existing in each slot. (2 RS H cannot be used for frequency offset measurement because a reference signal, which may compare frequency offsets, does not exist in 2 RS H. At step S902, the second UE which has received the discovery signal may estimate frequency offset by using the reference signal pattern of the discovery signal from the first UE. At step S903, the second UE may transmit the discovery signal (or response message to D2D communication request) by including frequency offset (or reference signal pattern most suitable for corresponding frequency offset on the basis of estimated frequency offset) in the discovery signal. At this time, the reference signal pattern of the signal transmitted from the second UE may be the same type as the reference signal pattern transmitted from the first UE, that is, the reference signal pattern that may estimate frequency offset.

At step S904, the first UE which has received the response message to the D2D request from the second UE may estimate frequency offset of the second UE by using the reference signal pattern of the response message. At step S905, the first UE may transmit a signal (or frequency offset estimated from the signal transmitted from the second UE or signal format for indicating the reference signal pattern suitable for frequency offset) for starting D2D communication by including information on frequency offset (or reference signal pattern which should be used by the second UE in D2D communication) of the second UE in the signal. The second UE which has received the signal may transmit a communication signal, which includes frequency offset (newly) estimated by itself or a recommended reference signal pattern based on the frequency offset, to the first UE (S906). Afterwards, transmission and reception may be performed in D2D communication of the first UE and the second UE by using the reference signal pattern based on frequency offset (or recommended RS pattern) measured by the other party. A signal (discovery signal) for estimating frequency offset may be transmitted with a certain period during D2D communication. For another example, the reference signal pattern declared by one UE of the D2D pair may be used by the corresponding pair. For example, if a UE which requests D2D communication determines a reference signal pattern based on frequency offset measured by itself and notifies the other party of the determined reference signal pattern, the corresponding pair may perform D2D communication on the basis of the corresponding reference signal pattern.

The above example relates to the operation in case of the D2D unicast, and in case of broadcast, a UE which transmits broadcast information may periodically transmit a signal having a reference signal pattern through which the UE may estimate frequency offset, and UEs which have received the signal may feed a recommended reference signal pattern back by estimating frequency offset of a broadcast signal. The UE which transmits broadcast information may change the reference signal pattern of the broadcast signal on the basis of the recommended reference signal pattern. For example, if some of UEs which receive a broadcast signal requests change of the reference signal pattern, the reference signal pattern may be changed, wherein some UEs are reserved at a certain ratio or more. Reference signal pattern information suggested as follows to notify a plurality of receiving UEs of reference signal pattern change information may be transmitted every subframe or at a certain period.

Scheduling Assignment (SA) with Dense RS Pattern

The aforementioned descriptions are especially useful if frequency offset is not fixed and is changed within a certain range (for example, if a difference in frequency offset occurs per subframe). If frequency offset is fixed uniformly (or is slowly changed), it may be favorable that frequency offset is measured per certain period. Therefore, a reference signal pattern of high density (for example, density that may exactly estimate frequency offset and may assure channel estimation performance at a certain level or more) may be used in an SA resource region. Afterwards, a reference signal pattern of lower density may previously be defined to be used in D2D communication indicated by the corresponding SA, or a reference signal pattern which will be used later (in a D2D resource indicated by the corresponding SA) may be signaled through the SA. This may mean that frequency offset correction is performed based on frequency offset estimated by the SA region to reach next SA transmission, and may mean that additional frequency offset estimation is not performed at an interval (that is, D2D resource scheduled by the SA) to which D2D data are transmitted. The case where the reference signal pattern of high density is signaled (in the D2D communication interval) by the SA (or the case where the reference signal pattern, which may estimate frequency offset, is signaled) may be excluded.

In this case, the signal may be the signal, which includes information on a D2D signal transmitted from the corresponding UE, such as resource information (time/frequency resource) which will be used to reach next SA transmission timing point after SA, information on a reference signal sequence, and scrambling sequence information of a data region. The SA may be transmitted per certain period or may be transmitted using an event-triggering mode.

Figure 10:
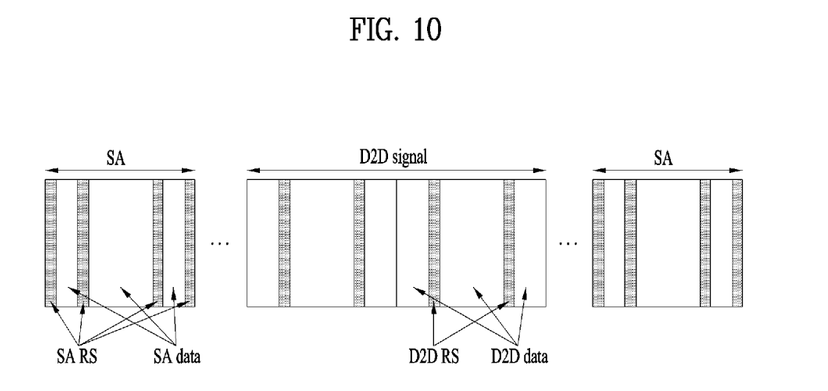
FIG. 10 is a diagram illustrating scheduling allocation and reference signal according to the embodiment of the present invention.

To reduce complexity of the receiving UE, DMRS sequence information obtained in the SA region and scrambling sequence information on SA information may be applied to the D2D signal transmitted after SA. For example, as shown in FIG. 10, when the D2D signal is transmitted from the SA and the region indicated by the SA (terms such as SA reference signal, SA data, D2D reference signal, and D2D data are used for identification in the drawing), the receiving UE may obtain a CS value used for an SA RS by performing blind detection for the SA reference signal and obtain a scrambling sequence parameter of SA data region by using the corresponding CS value. Afterwards, the receiving UE may assume that the CS value obtained from the SA reference signal is used as the CS value of the D2D reference signal for the D2D signal transmitted from the resource designated by the corresponding SA (until next SA is received), and that the scrambling parameter used for scrambling of the D2D data region is the same as a parameter of the SA data region.

The aforementioned embodiment is not limited to the SA, and it may be understood that the reference signal pattern having high reference signal density is periodically transmitted for frequency offset measurement. Alternatively, it may be understood that a respective reference signal pattern may be used per subframe used for D2D signal transmission.

In the aforementioned embodiments and drawings, the 2RS patterns may be the reused form of the legacy PUSCH DMRS, and the RS 2 symbols more added in the 4RS patterns than the 2RS patterns may be extension symbols of DMRS or another type RS (for example, legacy SRS structure). Also, the RS patterns may be deformed by the introduction of an AGC interval for tracking a power difference between a WAN and D2D, a Tx/RS switching interval, and an interval for timing advance (TA). For example, if ½ symbol is required for Tx/Rx switching, RS of the ½ symbol may be used for demodulation by using the SRS structure. Also, a deformed type (for example, sequence initialization) of RS such as the legacy PUSCH DMRS and SRS may be introduced.

Device Configuration According to Embodiment of the Present Invention

Figure 11:
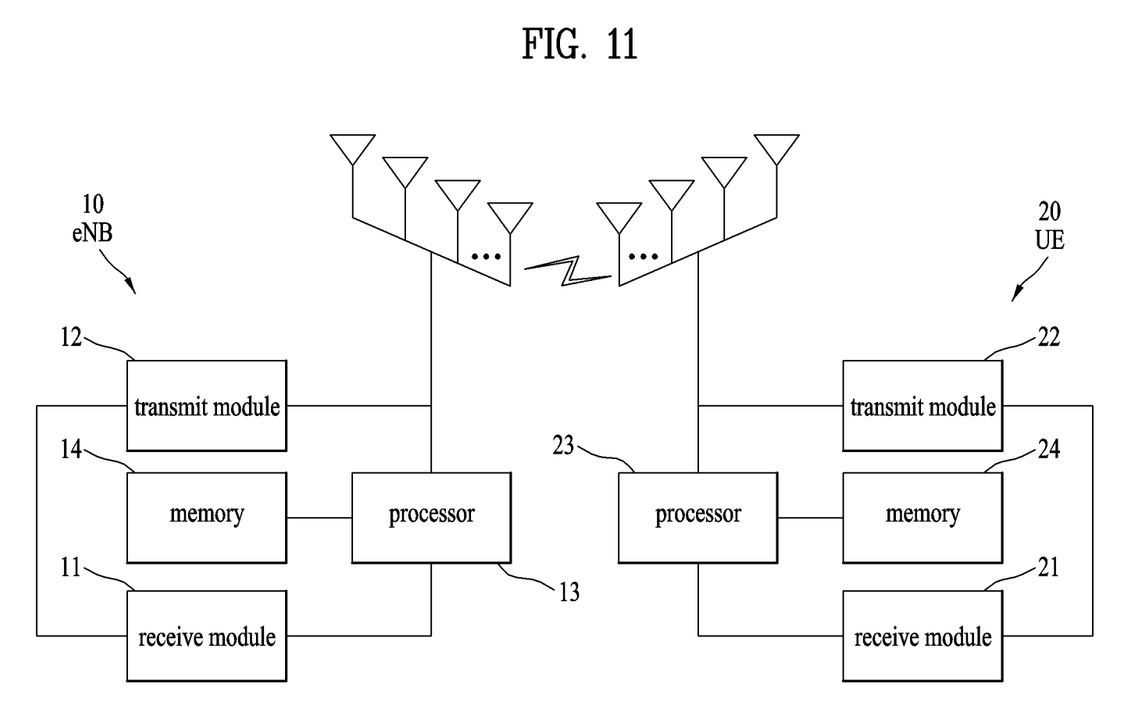
FIG. 11 is a diagram illustrating a configuration of a transceiving apparatus.

FIG. 11 is a diagram for configuration of a transmit point apparatus and a user equipment according to embodiment of the present invention.

Referring to FIG. 11, a transmit point apparatus 10 may include a receive module 11, a transmit module 12, a processor 13, a memory 14, and a plurality of antennas 15. The antennas 15 represent the transmit point apparatus that supports MIMO transmission and reception. The receive module 11 may receive various signals, data and information from a UE on an uplink. The transmit module 12 may transmit various signals, data and information to a UE on a downlink. The processor 13 may control overall operation of the transmit point apparatus 10.

The processor 13 of the transmit point apparatus 10 according to one embodiment of the present invention may perform processes necessary for the embodiments described above.

Additionally, the processor 13 of the transmit point apparatus 10 may function to operationally process information received by the transmit point apparatus 10 or information to be transmitted from the transmit point apparatus 10, and the memory 14, which may be replaced with an element such as a buffer (not shown), may store the processed information for a predetermined time.

Referring to FIG. 11, a UE 20 may include a receive module 21, a transmit module 22, a processor 23, a memory 24, and a plurality of antennas 25. The antennas 25 represent the UE that supports MIMO transmission and reception. The receive module 21 may receive various signals, data and information from an eNB on a downlink. The transmit module 22 may transmit various signals, data and information to an eNB on an uplink. The processor 23 may control overall operation of the UE 20.

The processor 23 of the UE 20 according to one embodiment of the present invention may perform processes necessary for the embodiments described above.

Additionally, the processor 23 of the UE 20 may function to operationally process information received by the UE 20 or information to be transmitted from the UE 20, and the memory 24, which may be replaced with an element such as a buffer (not shown), may store the processed information for a predetermined time.

The configurations of the transmit point apparatus and the UE as described above may be implemented such that the above-described embodiments can be independently applied or two or more thereof can be simultaneously applied, and description of redundant parts is omitted for clarity.

Description of the transmit point apparatus 10 in FIG. 11 may be equally applied to a relay as a downlink transmitter or an uplink receiver, and description of the UE 20 may be equally applied to a relay as a downlink receiver or an uplink transmitter.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

Embodiments of the present invention are applicable to various mobile communication systems.

The invention claimed is:

1. A method by which a user equipment (UE) receives a device-to-device (D2D) signal in a wireless communication system, the method comprising the steps of:
  receiving a subframe;
  receiving a first reference signal in a predetermined symbol of the subframe; and
  receiving reference signal pattern information in a symbol neighboring the predetermined symbol on the basis of the received reference signal,
  wherein if the reference signal pattern information indicates transmission of a second reference signal, the UE performs linear interpolation during channel estimation for D2D signal demodulation at the subframe.

2. The method according to claim 1, wherein the reference signal pattern information is a predetermined sequence mapped into resource elements on the neighboring symbol.

3. The method according to claim 1, wherein the reference signal pattern information is determined in accordance with a size of frequency offset between UEs which transmit and receive the D2D signal.

4. The method according to claim 3, wherein, if the size of frequency offset is a predetermined value or less, the reference signal pattern information indicates that the second reference signal is not transmitted.

5. The method according to claim 4, wherein the first reference signal and the second reference signal are respectively transmitted from a fourth symbol and a first symbol of each slot of the subframe.

6. The method according to claim 1, wherein slot hopping is applied to the first reference signal.

7. The method according to claim 1, wherein the reference signal pattern information is transmitted from a first slot only of the subframe if slot hopping is applied to the second reference signal.

8. The method according to claim 1, wherein the UE determines whether slot hopping has been applied to the second reference signal through a cyclic shift value of the first reference signal.

9. The method according to claim 1, wherein slot hopping depends on a predetermined pattern if the slot hopping is applied to the second reference signal.

10. The method according to claim 9, wherein the slot hopping is common within a D2D cluster.

11. The method according to claim 1, wherein the UE assumes that data are not mapped into a symbol, to which the second reference signal is transmitted, during D2D signal demodulation at the subframe if the reference signal pattern information indicates transmission of the second reference signal.

12. The method according to claim 1, wherein the reference signal pattern information is shifted on a frequency axis in accordance with a cyclic shift value of the first reference signal.

13. A D2D UE for receiving a D2D signal in a wireless communication system, the D2D UE comprising:
  a receive module; and
  a processor,
  wherein the processor receives a first reference signal in a predetermined symbol of a received subframe and receives reference signal pattern information in a symbol neighboring the predetermined symbol on the basis of the received reference signal, and
  if the reference signal pattern information indicates transmission of a second reference signal, the UE performs linear interpolation during channel estimation for D2D signal demodulation at the subframe.

* * * * *